(12) United States Patent
Boman et al.

(10) Patent No.: US 9,817,166 B2
(45) Date of Patent: Nov. 14, 2017

(54) ELECTROMAGNETIC ENERGY-ABSORBING OPTICAL PRODUCT AND METHOD FOR MAKING

(71) Applicant: Eastman Chemical Company, Kingsport, TN (US)

(72) Inventors: Lee Campbell Boman, Belmont, CA (US); Michael Hawkins, Martinsville, VA (US); Jeremy L. Isbell, Sunnyvale, CA (US); Kevin C. Krogman, Santa Clara, CA (US); Brija Nand, Hayward, CA (US); Kayur Ashwin Patel, San Jose, CA (US); Anthony Brian Port, Menlo Park, CA (US)

(73) Assignee: EASTMAN CHEMICAL COMPANY, Kingsport, TN (US)

( * ) Notice: Subject to any disclaimer, the term of this patent is extended or adjusted under 35 U.S.C. 154(b) by 0 days.

(21) Appl. No.: 15/134,864

(22) Filed: Apr. 21, 2016

(65) Prior Publication Data

US 2016/0231481 A1      Aug. 11, 2016

Related U.S. Application Data

(63) Continuation-in-part of application No. 14/569,955, filed on Dec. 15, 2014, now Pat. No. 9,453,949.

(51) Int. Cl.
*G02B 5/20*     (2006.01)
*G02B 1/04*     (2006.01)
(Continued)

(52) U.S. Cl.
CPC ........... *G02B 5/208* (2013.01); *B05D 1/02* (2013.01); *E06B 9/24* (2013.01); *G02B 1/04* (2013.01);
(Continued)

(58) Field of Classification Search
CPC .......... G02B 5/208; G02B 5/206; G02B 1/04; G02B 1/10; G02B 5/22; G02B 5/223;
(Continued)

(56) References Cited

U.S. PATENT DOCUMENTS 3,978,264 A     8/1976   Tarbell et al.
4,410,501 A     10/1983  Taramasso et al.
(Continued)

FOREIGN PATENT DOCUMENTS

CN     1765827 A        5/2006
EP     1 046 068 B1     5/2003
(Continued)

OTHER PUBLICATIONS

Co-pending U.S. Appl. No. 14/569,955, filed Dec. 15, 2014, Nand et al.
(Continued)

*Primary Examiner* — Euncha Cherry
(74) *Attorney, Agent, or Firm* — Michael K. Carrier

(57) ABSTRACT

An electromagnetic energy-absorbing optical product useful particularly for automotive and architectural window films is disclosed. The electromagnetic energy-absorbing optical product includes a polymeric substrate and a composite coating with the composite coating including first and second layers each containing a binding group component which together form a complimentary binding group pair.

20 Claims, 4 Drawing Sheets

(51) Int. Cl.
  *G02B 1/10* (2015.01)
  *E06B 9/24* (2006.01)
  *B05D 1/02* (2006.01)
  *G02B 5/22* (2006.01)
  *B60J 3/00* (2006.01)

(52) U.S. Cl.
  CPC .............. *G02B 1/10* (2013.01); *G02B 5/206* (2013.01); *G02B 5/223* (2013.01); *B60J 3/007* (2013.01); *E06B 2009/2417* (2013.01)

(58) Field of Classification Search
  CPC ... G02B 5/23; G02B 5/08; G02B 5/26; G02B 5/282; E06B 9/24; B60J 3/007; B32B 27/08; B32B 27/18; B32B 7/02; B32B 27/308; B32B 27/306; B32B 27/30
  USPC .............. 359/359, 361, 883, 884, 885, 241
  See application file for complete search history.

(56) References Cited

U.S. PATENT DOCUMENTS

| | | | |
|---|---|---|---|
| 4,952,457 | A | 8/1990 | Cartier et al. |
| 4,973,511 | A | 11/1990 | Farmer et al. |
| 5,019,197 | A | 5/1991 | Henderson |
| 5,091,258 | A | 2/1992 | Moran |
| 5,264,058 | A | 11/1993 | Hoagland et al. |
| 5,609,943 | A | 3/1997 | DeKoven et al. |
| 5,818,564 | A | 10/1998 | Gray et al. |
| 5,925,228 | A | 7/1999 | Panitz et al. |
| 6,055,088 | A | 4/2000 | Fix et al. |
| 6,221,112 | B1 | 4/2001 | Snider |
| 6,489,028 | B1 | 12/2002 | Degand et al. |
| 6,627,175 | B2 | 9/2003 | Schoebrechts |
| 6,881,444 | B2 | 4/2005 | Hong et al. |
| 7,311,943 | B2 | 12/2007 | Jacobson et al. |
| 8,234,998 | B2 | 8/2012 | Krogman et al. |
| 8,277,899 | B2 | 10/2012 | Krogman et al. |
| 8,689,726 | B2 | 4/2014 | Krogman et al. |
| 9,387,505 | B2 | 7/2016 | Krogman et al. |
| 2001/0046564 | A1 | 11/2001 | Kotov |
| 2001/0048975 | A1 | 12/2001 | Winterton et al. |
| 2002/0055552 | A1 | 5/2002 | Schliesman et al. |
| 2003/0167878 | A1 | 9/2003 | Al-Salim et al. |
| 2004/0224095 | A1 | 11/2004 | Miller |
| 2004/0229049 | A1 | 11/2004 | Boire |
| 2005/0019550 | A1 | 1/2005 | McGurran et al. |
| 2005/0025976 | A1 | 2/2005 | Faris |
| 2006/0029634 | A1 | 2/2006 | Berg et al. |
| 2006/0234032 | A1 | 10/2006 | Morrison et al. |
| 2007/0032869 | A1 | 2/2007 | Gilliard et al. |
| 2007/0053088 | A1 | 3/2007 | Kranz |
| 2007/0054194 | A1 | 3/2007 | Zhang et al. |
| 2007/0104922 | A1 | 5/2007 | Zhai et al. |
| 2008/0060302 | A1 | 3/2008 | Bletsos et al. |
| 2008/0299036 | A1 | 12/2008 | Vitner et al. |
| 2009/0015908 | A1 | 1/2009 | Ando et al. |
| 2009/0029077 | A1 | 1/2009 | Atanasoska et al. |
| 2009/0153953 | A1 | 6/2009 | Banerjee et al. |
| 2009/0155545 | A1 | 6/2009 | Purdy et al. |
| 2009/0161220 | A1 | 6/2009 | Banerjee et al. |
| 2009/0209665 | A1 | 8/2009 | Fu et al. |
| 2009/0324910 | A1 | 12/2009 | Gemici et al. |
| 2010/0003499 | A1 | 1/2010 | Krogman et al. |
| 2010/0092377 | A1 | 4/2010 | Scott et al. |
| 2010/0098902 | A1 | 4/2010 | Kotov et al. |
| 2010/0189913 | A1 | 7/2010 | Kotov et al. |
| 2010/0208349 | A1 | 8/2010 | Beer et al. |
| 2010/0209593 | A1 | 8/2010 | Banerjee et al. |
| 2010/0304150 | A1 | 12/2010 | Zheng et al. |
| 2010/0315693 | A1* | 12/2010 | Lam .................. G02B 5/23 359/241 |
| 2011/0014366 | A1 | 1/2011 | Nogueira et al. |
| 2011/0089018 | A1 | 4/2011 | Chang et al. |
| 2011/0135888 | A1 | 6/2011 | Xu et al. |
| 2011/0195239 | A1 | 8/2011 | Takane |
| 2011/0274767 | A1 | 11/2011 | Kato et al. |
| 2012/0028005 | A1 | 2/2012 | Zheng et al. |
| 2012/0082831 | A1 | 4/2012 | Wang et al. |
| 2012/0194819 | A1 | 8/2012 | Varma |
| 2013/0108832 | A1 | 5/2013 | Domercq et al. |
| 2013/0183516 | A1 | 7/2013 | Krogman et al. |
| 2013/0273242 | A1 | 10/2013 | Krogman et al. |
| 2014/0079884 | A1 | 3/2014 | Krogman et al. |
| 2014/0079922 | A1 | 3/2014 | Wang et al. |
| 2014/0218792 | A1 | 8/2014 | Krogman et al. |
| 2014/0220351 | A1 | 8/2014 | Krogman et al. |
| 2014/0242321 | A1 | 8/2014 | Schmid et al. |
| 2014/0242393 | A1 | 8/2014 | Olmeijer et al. |
| 2015/0285956 | A1 | 10/2015 | Schmidt et al. |

FOREIGN PATENT DOCUMENTS

| | | |
|---|---|---|
| EP | 2 130 844 A1 | 12/2009 |
| EP | 2226364 A1 | 9/2010 |
| EP | 2 343 579 A1 | 7/2011 |
| GB | 1 511 652 A | 5/1978 |
| GB | 2 198 739 A | 6/1988 |
| JP | H 04 197427 A | 7/1992 |
| JP | 11 292537 A | 10/1999 |
| JP | 2006-301125 A | 11/2006 |
| JP | 2008 041377 A | 2/2008 |
| JP | 2008-188513 A | 8/2008 |
| JP | 2010 132514 A | 6/2010 |
| KR | 10-2004-0086912 A | 10/2004 |
| KR | 10-2005-0059582 A | 6/2005 |
| KR | 10-2011-0082625 A | 7/2011 |
| KR | 10-2011-0083729 A | 7/2011 |
| WO | WO 00/10934 A1 | 3/2000 |
| WO | WO 2005/072947 A1 | 8/2005 |
| WO | WO 2006/100060 A2 | 9/2006 |
| WO | WO 2010/044402 A1 | 4/2010 |
| WO | WO 2011/144754 A2 | 11/2011 |
| WO | WO 2012/075309 A1 | 6/2012 |
| WO | WO 2014/099367 A1 | 6/2014 |
| WO | WO 2014/150903 A1 | 9/2014 |
| WO | WO 2014/172139 A2 | 10/2014 |
| WO | WO 2014/172332 A1 | 10/2014 |
| WO | WO 2014/193550 A1 | 12/2014 |
| WO | WO 2015/095317 A1 | 6/2015 |

OTHER PUBLICATIONS

ASTM G173-03; Standard Tables for Reference Solar Spectral Irradiances: Direct Normal and Hemispherical on 37° Tilted Surface.
ASTM D1003-07; Standard Test Method for Haze and Luminous Transmittance of Transparent Plastics.
ASTM D1787-89; Standard Test Method for Pentosans in Cellulose.
ASTM D3359-09$^{e2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers"; Chem. Mater.; 2005, vol. 17; pp. 1099-1105.
Nolte, Adam John; "Fundamental Studies of Polyelectrolyte Multilayer Films: Optical, Mechanical, and Lithographic Property Control"; Thesis (PhD); Massachusetts Institute of Technology; Dept. of Materials Science and Engineering; Feb. 2007 (Abstract, pp. 32-29, Figure 2.3).
Rouse, et al.; "Sol-Gel Processing of Ordered Multilayers to Produce Composite Films of Controlled Thickness"; Chem. Mater.; 2000; 12; pp. 2502-2507.

(56) References Cited

OTHER PUBLICATIONS

Kim, et al.; "Synthesis and Structures of New Layered Ternary Manganese Tellurides: AMnTe$_2$ (A=K, Rb, Cs) Na$_3$Mn$_4$Te$_6$, and NaMn$_{1.56}$Te$_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 dated Jun. 6, 2012.
PCT International Search Report for International Application No. PCT/US2012/025138 dated Oct. 30, 2012.
PCT International Search Report for International Application No. PCT/US2012/059147 dated Mar. 28, 2013.
PCT International Search Report for International Application No. PCT/US2012/062892 dated Mar. 29, 2013.
PCT International Search Report for International Application No. PCT/US2012/059142 dated Apr. 29, 2013.
PCT International Search Report for International Application No. PCT/US2013/059337 dated Dec. 6, 2013.
U.S. Office Action dated May 21, 2014 in co-pending U.S. Appl. No. 14/024,649.
U.S. Office Action dated Jul. 23, 2014 in co-pending U.S. Appl. No. 13/633,809.
U.S. Office Action dated Sep. 25, 2014 in co-pending U.S. Appl. No. 14/024,649.
U.S. Office Action dated Feb. 11, 2015 in co-pending U.S. Appl. No. 13/633,809.
U.S. Office Action dated Jun. 5, 2015 in co-pending U.S. Appl. No. 13/861,368.
U.S. Office Action dated Jul. 8, 2015 in co-pending U.S. Appl. No. 14/246,084.
Cammarata, et al.; "Carbodiimide Induced Cross-Linking, Ligand Addition, and Degradation in Gelatin"; Molecular Pharmaceutics; 2015; 12; pp. 783-793.
U.S. Office Action dated Sep. 8, 2015 in co-pending U.S. Appl. No. 13/633,809.
U.S. Office Action dated Sep. 11, 2015 in co-pending U.S. Appl. No. 14/024,649.
U.S. Office Action dated Oct. 30, 2015 in co-pending U.S. Appl. No. 14/028,450.
Wu et al.; "Deformable Antireflection Coatings from Polymer and Nanoparticle Multilayers"; Advanced Materials, 2006, 18, pp. 2699-2702.
U.S. Office Action dated Nov. 5, 2015 in co-pending U.S. Appl. No. 13/967,770.
U.S. Office Action dated Dec. 4, 2015 in co-pending U.S. Appl. No. 13/861,368.
U.S. Office Action dated Dec. 17, 2015 in co-pending U.S. Appl. No. 14/246,096.
U.S. Notice of Allowance dated Jan. 20, 2016 in co-pending U.S. Appl. No. 14/569,955.
U.S. Notice of Allowance dated Feb. 11, 2016 in co-pending U.S. Appl. No. 14/569,955.
U.S. Office Action dated Feb. 16, 2016 in co-pending U.S. Appl. No. 13/633,809.
U.S. Office Action dated Feb. 19, 2016 in co-pending U.S. Appl. No. 14/246,084.
U.S. Office Action dated Mar. 18, 2016 in co-pending U.S. Appl. No. 14/267,944.
PCT International Search Report for International Application No. PCT/US2015/063082 dated Mar. 24, 2016.
Co-pending U.S. Appl. No. 15/134,875, filed Apr. 21, 2016, Boman et al.
U.S. Notice of Allowance dated Apr. 26, 2016 in co-pending U.S. Appl. No. 14/246,096.
U.S. Office Action dated May 18, 2016 in co-pending U.S. Appl. No. 14/028,450.
U.S. Office Action dated May 19, 2016 in co-pending U.S. Appl. No. 13/861,368.
U.S. Notice of Allowance dated May 20, 2016 in co-pending U.S. Appl. No. 14/024,649.
U.S. Notice of Allowance dated May 20, 2016 in co-pending U.S. Appl. No. 14/246,096.
U.S. Notice of Allowance dated May 24, 2016 in co-pending U.S. Appl. No. 13/967,770.
U.S. Office Action dated Jun. 16, 2016 in co-pending U.S. Appl. No. 13/633,809.
PCT International Search Report for International Application No. PCT/US2016/028757 dated Sep. 1, 2016.
U.S. Office Action dated Sep. 6, 2016 in co-pending U.S. Appl. No. 13/861,368.
Co-pending U.S. Appl. No. 15/274,348, filed Sep. 23, 2016, Nand et al.
U.S. Office Action dated Sep. 26, 2016 in co-pending U.S. Appl. No. 14/267,944.
Supplementary European Search Report dated Nov. 4, 2016 for European Patent Application No. 13836268.6.
Hiller, Jeri'Ann et al, "Reversibly erasable nanoporous anti-reflection coatings from polyelectrolyte multilayers"Nature Materials, vol. 1 No. 1, Sep. 1, 2002, pp. 59-63, XP055016249.
PCT International Search Report for International Application No. PCT/US2016/028756 dated Nov. 29, 2016.
USPTO Notice of Allowance dated Jun. 29, 2017 in co-pending U.S. Appl. No. 15/274,348.
USPTO Notice of Allowance dated Jun. 29, 2017 in co-pending U.S. Appl. No. 15/134,875.
Co-pending U.S. Appl. No. 15/689,493, filed Aug. 29, 2017, Krogman et al.

* cited by examiner

ELECTROMAGNETIC ENERGY-ABSORBING OPTICAL PRODUCT AND METHOD FOR MAKING

RELATED APPLICATIONS

This application is a continuation-in-part of and claims priority to co-pending U.S. application Ser. No. 14/569,955 filed on Dec. 15, 2014, which is incorporated fully herein by reference.

FIELD OF THE INVENTION

The present invention broadly relates to optical products for use primarily in automotive and architectural window film applications and methods for their manufacture. More particularly, the present invention relates to an electromagnetic energy-absorbing window film with a composite coating including a first layer that includes a polyionic binder and a second layer that includes an electromagnetic energy-absorbing insoluble particle, wherein said first layer and second layer each include a binding group component which together form a complimentary binding group pair.

BACKGROUND OF THE INVENTION

Color has typically been imparted to optical products such as automotive and architectural window films by use of organic dyes. More particularly, the current commercial practice for producing dyed film from polyester involves swelling of the molecular structure of the substrate in baths of hot organic solvent such as ethylene glycol during the dyeing process, as swelled polyester (particularly PET) films are capable of absorbing organic dyes. These films and their manufacturing process suffer many drawbacks. Firstly, the substrates require exposure to organic solvents and elevated temperatures, which present both mechanical and chemical challenges such as environmental hazards and costs associated with storing the raw solvents and disposing of the resulting waste. Further, swelled substrates require special handling to avoid downstream stretching thereby decreasing the production yield. Next, the polyester's elevated process temperatures and residual solvents in the substrate film after drying constrain downstream use and processing of substrates which in turn limits the potential end-use applications for such dyed films. On the process side, the existing methodology uses large volume dye baths which makes rapid color change within commercial manufacturing difficult. Finally, only a limited number of organic dyes are soluble and stable in the hot solvent swelling media and many of those are often subject to degradation by high energy radiation (sub 400 nm wavelength) to which the substrate is subjected when used in window film applications, thereby shortening the useful lifetime of the product.

To address these drawbacks, some film manufacturers have transitioned to using a pigmented layer on the surface of a base polymeric film for tinting a polymeric film. For example, U.S. Published Application No. 2005/0019550A1 describes color-stable, pigmented optical bodies comprising a single or multiple layer core having at least one layer of an oriented thermoplastic polymer material wherein the oriented thermoplastic polymer material has dispersed within it a particulate pigment. As noted in this published application, these products can suffer myriad processing and performance drawbacks. For example, layers of this type are typically applied as thin films and can employ a relatively high pigment concentration to achieve a desired tint level, particularly in automotive window films with a relatively high desired level of darkening such as those with an electromagnetic energy transmittance in the visible region (or $T_{vis}$) of less than 50%. These high pigment concentrations are difficult to uniformly disperse within the thin layer. More generally, pigmented layers can suffer from greater haze and reduced clarity even in applications (for example architectural window films) with a relatively moderate, low and even minimal levels of desired darkening.

A continuing need therefore exists in the art for an optical product that meets all the haze, clarity, UV-stability and product longevity demands of current commercial window films, while also being manufacturable by an environmentally friendly, aqueous-based coloring process performed preferably at ambient temperatures and pressures.

SUMMARY OF THE INVENTION

An electromagnetic energy-absorbing optical product that includes a polymeric substrate and a composite coating, the composite coating having a first layer that includes a polyionic binder and a second layer that includes a pigment blend, wherein each of said first layer and said second layer includes a binding group component which together form a complimentary binding group pair.

Further aspects of the invention are as disclosed and claimed herein.

BRIEF DESCRIPTION OF THE DRAWINGS

The invention will be described in further detail below and with reference to the accompanying drawings, wherein like reference numerals throughout the figures denote like elements and in wherein.

DETAILED DESCRIPTION

Figure 1:
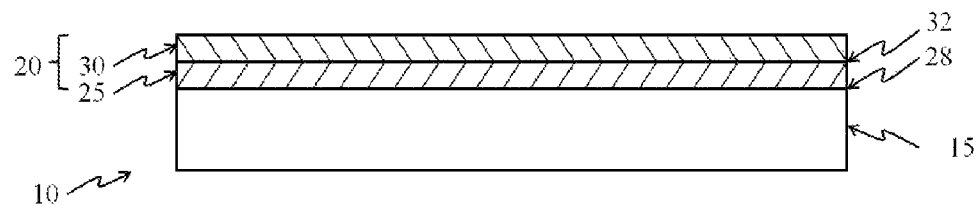
FIG. 1 is a schematic cross-section of an embodiment of the electromagnetic energy-absorbing optical product of the present invention.
Figure 2:
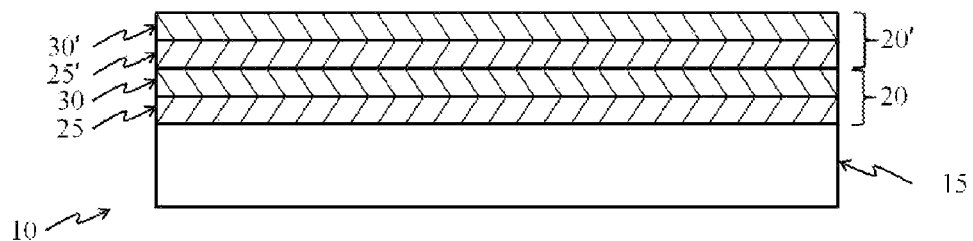
FIG. 2 is a schematic cross-section of an embodiment of the electromagnetic energy-absorbing optical product of the present invention that includes a plurality of composite coatings.

As shown in FIGS. 1 and 2, the present invention is generally directed to an electromagnetic energy-absorbing optical product 10 comprising a polymeric substrate 15 and a composite coating 20. The composite coating includes a first layer 25 and a second layer 30. Preferably first layer 25 is immediately adjacent to said polymeric substrate 20 at its first face 28 and second layer 30 is immediately adjacent to first layer 25 at its opposite face 32. This first layer 25 includes a polyionic binder while the second layer 30 includes an electromagnetic energy-absorbing insoluble particle. Each layer 25 and 30 includes a binding group component with the binding group component of the first layer and the binding group component of the second layer constituting a complimentary binding group pair. As used herein, the phrase "complimentary binding group pair" means that binding interactions, such as electrostatic binding, hydrogen bonding, Van der Waals interactions, hydrophobic interactions, and/or chemically induced covalent bonds are present between the binding group component of the first layer and the binding group component of the second layer of the composite coating. A "binding group component" is a chemical functionality that, in concert with a complimentary binding group component, establishes one or more of the binding interactions described above. The components are complimentary in the sense that binding interactions are created through their respective charges.

The first layer 25 of the composite coating includes a polyionic binder, which is defined as a macromolecule containing a plurality of either positive or negative charged moieties along the polymer backbone. Polyionic binders with positive charges are known as polycationic binders while those with negative charges are termed polyanionic binders. Also, it will be understood by one of ordinary skill that some polyionic binders can function as either a polycationic binder or a polyanionic binder depending on factors such as pH and are known as amphoteric. The charged moieties of the polyionic binder constitute the "binding group component" of the first layer.

Suitable polycationic binder examples include poly(allylamine hydrochloride), linear or branched poly(ethyleneimine), poly(diallyldimethylammonium chloride), macromolecules termed polyquaterniums or polyquats and various copolymers thereof. Blends of polycationic binders are also contemplated by the present invention. Suitable polyanionic binder examples include carboxylic acid containing compounds such as poly(acrylic acid) and poly(methacrylic acid), as well as sulfonate containing compounds such as poly(styrene sulfonate) and various copolymers thereof. Blends of polyanionic binders are also contemplated by the present invention. Polyionic binders of both polycationic and polyanionic types are generally well known to those of ordinary skill in the art and are described for example in U.S. Published Patent Application number US2014/0079884 to Krogman et al, the disclosure of which is incorporated herein by reference. Examples of suitable polyanionic binders include polyacrylic acid (PAA), poly(styrene sulfonate) (PSS), poly(vinyl alcohol) or poly(vinylacetate) (PVA, PVAc), poly(vinyl sulfonic acid), carboxymethyl cellulose (CMC), polysilicic acid, poly(3,4-ethylenedioxythiophene) (PEDOT) and combinations thereof with other polymers (e.g. PEDOT:PSS), polysaccharides and copolymers of the above mentioned. Other examples of suitable polyanionic binders include trimethoxysilane functionalized PAA or PAH or biological molecules such as DNA, RNA or proteins. Examples of suitable polycationic binders include poly(diallyldimethylammonium chloride) (PDAC), Chitosan, poly(allyl-amine hydrochloride) (PAH), polysaccharides, proteins, linear poly(ethyleneimine) (LPEI), branched poly(ethyleneimine) (BPEI) and copolymers of the above-mentioned, and the like. Examples of polyionic binders that can function as either polyanionic binders or polycationic binders include amphoteric polymers such as proteins and copolymers of the above mentioned polycationic and polyanionic binders.

The concentration of the polyionic binder in the coating composition used to form the first layer may be selected based in part on the molecular weight of its charged repeat unit but will typically be between 0.1 mM-100 mM, more preferably between 0.5 mM and 50 mM and most preferably between 1 and 20 mM based on the molecular weight of the charged repeat unit comprising the first layer. Preferably the polyionic binder is a polycation binder and more preferably the polycation binder is polyallylamine hydrochloride. Most preferably the polyionic binder is soluble in water and the composition used to form the first layer is an aqueous solution of polyionic binder. In an embodiment wherein the polyionic binder is a polycation and the first layer is formed from an aqueous solution, the pH of the aqueous solution is selected so that from 5 to 95%, preferably 25 to 75% and more preferably approximately half of the ionizable groups are protonated. Other optional ingredients in the first layer include biocides or shelf-life stabilizers.

The second layer 30 of the composite coating 20 includes at least one electromagnetic energy-absorbing insoluble particle. The phrase "electromagnetic energy-absorbing" means that the particle is purposefully selected as a component for the optical product for its preferential absorption at particular spectral wavelength(s) or wavelength ranges(s). The term "insoluble" is meant to reflect the fact that the particle does not substantially dissolve in the composition used to form the second layer 30 and exists as a particle in the optical product structure. The electromagnetic energy-absorbing insoluble particle is preferably a visible electromagnetic energy absorber, such as a pigment; however, insoluble particles such as UV absorbers or IR absorbers, or absorbers in various parts of the electromagnetic spectrum that do not necessarily exhibit color, are also within the scope of the present invention. The electromagnetic energy-absorbing particle is preferably present in the second layer in an amount of from 30% to 60% by weight based on the total weight of the composite coating. In order to achieve the desired final electromagnetic energy absorption level, the second layer should be formed from a composition that includes the insoluble electromagnetic energy-absorbing particle or particles in the amount of 0.25 to 2 weight percent based on the total weight of the composition.

Pigments suitable for use as the electromagnetic energy-absorbing insoluble particle in a preferred embodiment of the second layer are preferably particulate pigments with an average particle diameter of between 5 and 300 nanometers, more preferably between 50 and 200 nanometers, often referred to in the art as nanoparticle pigments. Even more preferably, the surface of the pigment includes the binding group component of the second layer. Suitable pigments are available commercially as colloidally stable water dispersions from manufacturers such as Cabot, Clariant, DuPont, Dainippon and DeGussa, among others. Particularly suitable pigments include those available from Cabot Corporation under the Cab-O-Jet® name, for example 250C (cyan), 265M (magenta), 270Y (yellow) or 352K (black). In order to be stable in water as a colloidal dispersion, the pigment particle surface is typically treated to impart ionizable character or functionality thereto and thereby provide the pigment with the desired binding group component on its surface. Suitable ionizable functionalities for the pigment surface include an ionizable sulfonate functionality, an ionizable carboxylate functionality or an ionizable phosphate or bisphosphonate functionality. For example, Cab-O-Jet® pigments commercially available from Cabot Corporation, for example those sold under the trade names 250C (cyan), 265M (magenta), 270Y (yellow) and 200 (black), each have a pigment surface with ionizable sulfonate functionality. Cab-O-Jet® pigments commercially available from Cabot Corporation, for example those under the trade names 352K (black) and 300 (black), each have a pigment surface with an ionizable carboxylate functionality. It will be understood by ordinary skill that commercially available pigments are sold in various forms such as suspensions, dispersions and the like, and care should be taken to evaluate the commercial form of the pigment and modify it as/if necessary to ensure its compatibility and performance with the optical product components, particularly in the embodiment wherein the pigment surface also functions as the binding group component of the second layer.

In one particular embodiment, multiple pigments may be utilized in the second layer to achieve a specific hue or shade or color in the final product; however, it will again be understood by ordinary skill that, should multiple pigments be used, they should be carefully selected to ensure their compatibility and performance both with each other and with the optical product components. This is particularly relevant in the embodiment wherein the pigment includes ionizable functionality at its surface that functions as the binding group component of the second layer, as for example particulate pigments can exhibit different surface charge densities due to different chemical modifications that can impact compatibility. In such an embodiment, the second layer includes a pigment blend and the binding group component of the second layer is an ionizable functionality at the surface of each pigment in the pigment blend. The term "blend" as it relates to the pigments is intended to mean the presence of two or more pigments.

In a particularly preferred embodiment, the ionizable functionality is the same ionizable functionality for each pigment in the pigment blend. In a more particularly preferred embodiment, this same ionizable functionality is an ionizable sulfonate functionality. In another more particularly preferred embodiment, this same ionizable functionality is an ionizable carboxylate functionality. Other pigment surface ionizable functionalities utilizable as the binding group component in the second layer are known in the art and include phosphate and bisphosphonate.

Though as described above it is preferred that the pigment surface of each pigment in the pigment blend includes the same ionizable functionality, it has also been unexpectedly discovered that pigments with surfaces having different ionizable functionalities may be included in the pigment blend. Accordingly, in another embodiment, the pigment blend includes at least one first pigment with a first ionizable functionality at its surface and at least one second pigment with a second ionizable functionality at its surface that is different from the first ionizable functionality. The first ionizable functionality is preferably ionized at any pH while the second ionizable functionality is characterized by pH-dependent ionizability and therefore may be titrated between its ionized and neutral forms as discussed in more detail below. Preferably, the first ionizable functionality is an ionizable sulfonate functionality and the second ionizable functionality is an ionizable carboxylate functionality such that the pigment blend may include a blend of a first pigment with an ionizable sulfonate functionality at its surface and a second pigment with an ionizable carboxylate functionality at its surface. Pigment blends that further optionally include at least one additional pigment with ionizable functionality at its surface that is the same as or different from either the first or the second ionizable functionality will be understood to be within the scope of this embodiment.

Preferably the coating composition used to form the second layer of the composite coating, and therefore the second layer itself, further includes a screening agent. A "screening agent" is defined as an additive that promotes even and reproducible deposition of the second layer via improved dispersion of the electromagnetic energy-absorbing insoluble particle within the second layer by increasing ionic strength and reducing interparticle electrostatic repulsion. Screening agents are generally well known to those of ordinary skill in the art and are described for example in U.S. Published Patent Application number US2014/0079884 to Krogman et al. Examples of suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents. Sodium chloride is typically a preferred screening agent based on ingredient cost. The presence and concentration level of a screening agent may allow for higher loadings of the electromagnetic energy-absorbing insoluble particle such as those that may be desired in optical products with a $T_{vis}$ of no more than 50% and also may allow for customizable and carefully controllable loadings of the electromagnetic energy-absorbing insoluble particle to achieve customizable and carefully controllable optical product $T_{vis}$ levels.

Suitable screening agent concentrations can vary with salt identity and are also described for example in U.S. Published Patent Application number US2014/0079884 to Krogman et al. In some embodiments, the screening agent concentration can range between 1 mM and 1000 mM or between 10 mM and 100 mM or between 30 mM and 80 mM. In some embodiments the screening agent concentration is greater than 1 mM, 10 mM, 100 mM or 500 mM.

The coating composition used to form the second layer of the composite coating, and therefore the second layer itself, may also contain other ingredients such as biocides or shelf-life stabilizers.

In some embodiments, the electromagnetic energy-absorbing optical product of the present invention may include a plurality of composite coatings. For example, as depicted in FIG. 2, the optical product 10 includes first and second composite coatings 20 and 20', each with a first layer and second layer, i.e. first composite coating 20 including first layer 25 and second layer 30 and second composite coating 20' including first layer 25' and second layer 30'. This depiction is not intended to be limiting in any way on the possible number of composite coatings and one or ordinary skill will appreciate that this depiction is simply exemplary and illustrative of an embodiment with multiple or a plurality of composite coatings. The examples below further illustrate embodiments with a plurality of composite coatings.

For embodiments with a plurality of composite coatings, it will be appreciated that the electromagnetic energy-absorbing insoluble particle for the second layer in each composite coating may be independently selected and that the second layers will in combination provide an additive effect on the electromagnetic energy-absorbing character and effect of the electromagnetic energy-absorbing optical product. For the embodiment shown in FIG. 2, this means that the second layer 30 of the first composite coating 20 and the second layer 30' of the second composite coating 20' in combination provide an additive effect on the electromagnetic energy-absorbing character and effect of the electromagnetic energy-absorbing optical product. This additive effect can be customized and carefully controlled in part by the concentration of the electromagnetic energy-absorbing particle in each second layer as dispersed through the presence of the screening agent. For example, in an embodiment wherein the electromagnetic energy-absorbing particle is a pigment, the second layers will in combination provide an additive effect on the visually perceived color of said electromagnetic energy-absorbing optical film product. In this embodiment, the pigments for each second layer may be of same or similar composition and/or color such that the additive effect is to increase intensity or depth or darkness of the visually perceived color of the optical product or, stated another way, to reduce electromagnetic transmittance in the visible wavelength range (or $T_{vis}$). In another embodiment, carbon black is used as the pigment for at least one second layer and pigments such as those listed above are used as pigments for the other second layer(s) such that the additive effect is a visually perceived darkened color, also reducing electromagnetic transmittance in the visible wavelength range (or $T_{vis}$). As discussed above, the present invention may be useful in products wherein relatively high levels of darkening are desired. Accordingly, in a particularly preferred embodiment, the optical products of the present invention have a $T_{vis}$ of no more than 50%, more preferably a $T_{vis}$ of no more than 25% and even more preferably a $T_{vis}$ of no more than 10%. In yet another embodiment, the pigments for each second layer may be of complimentary composition and/or color such that the additive effect is a visually perceived color different from and formed by their combination of the individual pigments, for example an additive perceived "green" color achieved by utilizing a blue pigment for one second layer and a yellow pigment for another second layer.

The polymeric substrate 15 may in the broadest sense be any substrate known in the art as useable as an optical product component. A suitable polymeric substrate is typically a flexible polymeric film, more particularly a polyethylene terephthalate (PET) film of a thickness of between 12 μ and 375 μ. As prior art optical products employing dyes exhibit a variety of drawbacks, the polymeric substrate is most preferably an undyed transparent polyethylene terephthalate film. The polymeric substrate may further include additives known in the art to impart desirable characteristics. A particular example of such an additive is an ultraviolet (UV) absorbing material such as a benzotriazole, hydroxybenzophenones or triazines. A useful polymeric substrate with a UV absorbing additive incorporated therein is described in U.S. Pat. No. 6,221,112, originally assigned to a predecessor assignee of the present invention.

In one embodiment wherein the polymeric substrate is a flexible polymeric film such as PET, the optical product may be a window film. As well known in the art, conventional window films are designed and manufactured with levels of electromagnetic energy transmittance or reflectivity that are selected based on a variety of factors such as for example product end use market application and the like. In one embodiment, the optical product of the present invention has visible light transmittance or $T_{vis}$ of no more than 50%, preferably no more than 25% and more preferably no more than 10%. Such levels of visible light transmittance are often desired in window films with high levels of darkening for certain automotive end use applications such as sidelights. In another embodiment, the optical product of the present invention has visible light transmittance or $T_{vis}$ of from 80 to 85%. Such levels of visible light transmittance are often desired in window films with relatively moderate to low levels of darkening (typically also with infrared absorption) for (to the extent permitted by governmental regulation) certain automotive end use applications such as windscreens. In yet another embodiment, the optical product of the present invention has visible light transmittance or $T_{vis}$ of no less than 85%, preferably no less than 88% and more preferably no less than 90%. Such levels of visible light transmittance are often desired in window films with low to minimal levels of darkening for certain architectural end use applications.

The window films may optionally include layers or coatings known to those of ordinary skill in the window film art. Coatings for example may include protective hardcoats, scratch-resist or "SR" coats, adhesive layers, protective release liners and the like. Coating layers for the optical products of the present invention may include for example metallic layers, dielectric layers, ceramic layers and combinations thereof, and may be formed by conventional methods such as sputtering or other known techniques. Such coating layers or coatings may be components of the polymeric substrate. Accordingly, the polymeric substrate may include a coating layer selected from the group consisting of a metallic layer, a dielectric layer, a ceramic layer and combinations thereof, as a component. Further, the polymeric substrate may be a laminated or multilayer structure.

In an embodiment wherein the polymeric substrate is a flexible polymeric film such as PET, the optical product is a composite interlayer for laminated glass and further includes at least one safety film or interlayer. The safety film may be formed from film-forming materials known in the art for this purpose, including for example plasticized polyvinyl butyral (PVB), polyurethanes, polyvinyl chloride, polyvinyl acetal, polyethylene, ethyl vinyl acetates and the like. Preferred safety film is a plasticized PVB film or interlayer commercially available from Eastman Chemical Company as SAF-LEX® PVB interlayer. Preferably, the composite interlayer includes two safety films or one film layer and one coating layer, such as a PVB coating that encapsulate the polymeric substrate. Composite interlayers of this general type are known in the art and are described for example in U.S. Pat. Nos. 4,973,511 and 5,091,258, the contents of which are incorporated herein by reference.

In another aspect, the present invention is directed to a method for forming an electromagnetic energy-absorbing optical product. The method of present invention includes (a) applying a first coating composition to a polymeric substrate to form a first layer and (b) applying a second coating composition atop said first layer to form a second layer, said first layer and said second layer together constituting a composite coating. The first coating composition includes a polyionic binder and the second coating composition includes at least one electromagnetic energy-absorbing insoluble particle and each of said first and second coating compositions include a binding group component which together form a complimentary binding group pair. The second coating composition preferably includes a screening agent as defined above.

In a preferred embodiment, at least one of the first and second coating compositions are an aqueous dispersion or solution and most preferably both of the first and second coating compositions are an aqueous dispersion or solution. In this embodiment, both applying steps (a) and (b) are performed at ambient temperature and pressure.

The optical products of the present invention are preferably manufactured using known "layer-by-layer" (LbL) processes such as described in Langmuir, 2007, 23, 3137-3141 or in U.S. Pat. Nos. 8,234,998 and 8,689,726 and U.S. Published Application US 2014/0079884, co-invented by co-inventor Krogman of the present application, the disclosures of which are incorporated herein by reference.

With respect to the embodiment where the second layer includes a pigment blend, it has been unexpectedly discovered that mass transfer effects within the coating composition used to form apply the second layer, as generated by the particle size relationships between the pigments in the pigment blend, play a dominant role in defining the compositional uniformity of and visible color effect from the second layer of the optical product. As the manufacturing process described above is generally termed a wet deposition technique with the second coating composition applied atop the first layer to form the second layer, pigment particles in the second coating composition must diffuse through the applied layer of the second coating composition to reach the first layer where the ionizable functionalities, acting as the second layer's binding group component, participate in electrostatic binding with the binding group component in the first layer. Due to the referenced mass transfer effects, relatively larger diameter pigment particles will diffuse through the coating and arrive at the surface relatively slower than smaller diameter pigment particles. If, by way of non-limiting example, a dispersion is made by combining equal parts of a 1 wt % dispersion of Cab-o-Jet 200 carbon black (average particle size 141 nm) and a 1 wt % dispersion of Cab-o-Jet 250C cyan, both pigment surfaces contain the same ionizable sulfonate group. When a film is applied as described below in Example 2, the resulting film does not produce an absorbance spectrum equal to the additive combination of the two individual carbon black or cyan film spectra. The resulting film unexpectedly exhibits roughly 85% of the expected carbon black character relative to the expected cyan character, a feature which can be attributed to the larger particle size shown by the carbon black pigment and the corresponding relative mass transfer advantage that the smaller cyan particles experience. This phenomenon must be accounted for and the relative pigment amounts in the pigment blend adjusted to produce the desired color effect from the second layer.

With respect to the embodiment wherein the pigments in the pigment blend have differing ionizable functionalities at the pigment surface, it was further unexpectedly discovered that the differing surface charge densities from the different functionalities can detrimentally impact the compatibility and interaction between pigments in the pigment blend and accordingly the dispersion and uniformity of the pigments within the second layer. Accordingly, it is preferred to minimize if not eliminate this impact from differing charge densities, and thereby facilitate mass transfer effects within the second layer as described previously for pigments functionalized with the same ionizable surface groups, to play a dominant role in defining the compositional uniformity of and visible color effect from the second layer of the optical product. It is well known that different chemical groups occupy different free volumes, and it is expected that surfaces functionalized with for example carboxylate groups will contain a higher areal density of charges than surfaces functionalized with for example sulfonate groups. By titrating the second coating composition pH to reduce the degree of ionization of the pigment surface with the more densely functionalized (e.g. carboxylate) group thereby reducing if not eliminating the referenced impact of differing charge density. The competition within the coating composition used to apply the second layer for forming complementary binding group pairs between the first layer binding group component and second layer binding group component of the composite coating during deposition is thereby reduced to one akin to that described above for pigment particles with the same ionizable functionality at their respective surfaces. In the embodiment with at least one first pigment with a first ionizable functionality its surface and at least one second pigment with a second ionizable functionality at its surface that is different from said first ionizable functionality, it will therefore be appreciated that processing techniques such as for example adjusting pH to control degree of ionization of the surface group, or ionic strength adjustment to reduce the length over which electrostatic forces may be useful during manufacturing in order to control the competitive migration of differently functionalized pigments within the second layer coating composition and achieve consistent production of a suitable optical product.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

EXAMPLE 1

To produce a coating composition suitable for forming the second layer of the composite coating of the present invention, 66.67 g of Cab-O-Jet 352K, a dispersion of electromagnetic energy-absorbing insoluble particle, a colloidally stable carbon black pigment commercially available from Cabot Corp., was diluted in deionized water to 1 wt % carbon black. As the surface of the carbon black particles are chemically functionalized with carboxylate groups by the manufacturer (thereby providing the binding group component), the pH of the solution is adjusted to 9 with sodium hydroxide to ensure the carboxylate groups are fully deprotonated. 2.92 g of sodium chloride are then added to the solution (50 mM) to screen the electrostatic repulsion of the particles in suspension and prepare them for deposition, where 50 mM NaCl has been determined to electrostatically screen the surface charge of the carbon black particles without causing them to aggregate and precipitate from solution.

EXAMPLE 2

Figure 3:
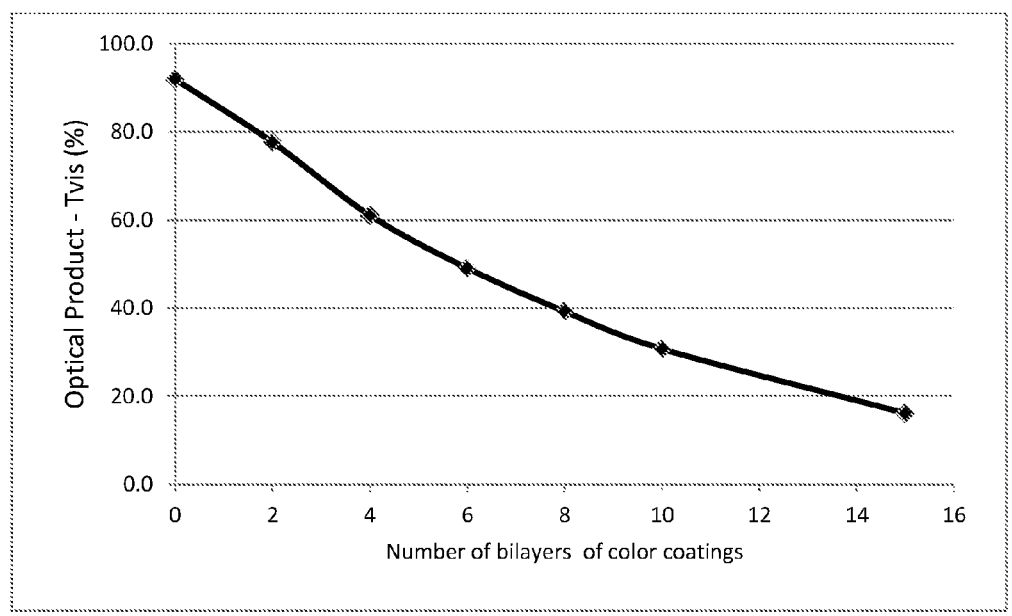
FIG. 3 is a graph depicting electromagnetic transmittance data generated from analysis of the electromagnetic energy-absorbing optical products produced in Example 2.

To form the optical product of the present invention, a sheet of polyethylene terephthalate (PET) film (as substrate) with a thickness of 75 microns was pretreated as known in the art by passing through a conventional corona treatment. A first layer was then formed on the PET sheet by spray coating, at ambient pressure and temperature, a first coating composition of 20 mM solution, based on the molecular weight of the charged repeat unit, of polyallylamine hydrochloride with an adjusted pH of 10. Excess non-absorbed material was rinsed away with a deionized water spray. The composition prepared in Example 1 above for use in forming the second layer was then sprayed onto the surface of the first layer with excess material again rinsed away in a similar fashion with the first layer and electromagnetic energy-absorbing particle-containing second layer constituting the composite color coating of the present invention. Additional composite coatings were applied to the existing substrate using the same procedure with the visible electromagnetic transmittance ($T_{vis}$) of the electromagnetic energy-absorbing optical product measured using a BYK HazeGard Pro after application of 2,4,6,8,10 and 15 composite color coatings. The results of the $T_{vis}$ measurements are graphically depicted in FIG. 3.

EXAMPLE 3

To produce compositions suitable for forming the second layer of the composite coatings of the present invention, three separate 100 g samples of a dispersion of colloidally stable color pigment, using Cabot Cab-O-Jet 250C cyan, 265M magenta, or 270Y yellow respectively, were each diluted in deionized water to 1 wt % pigment to form coating compositions for use in Example 4 below. 2.92 g of sodium chloride are then added to the solution (50 mM) to screen the electrostatic repulsion of the particles in suspension and prepare them for deposition, where 50 mM NaCl has been determined to electrostatically screen the surface charge of the pigment particles without causing them to aggregate and precipitate from solution.

EXAMPLE 4

Figure 4:
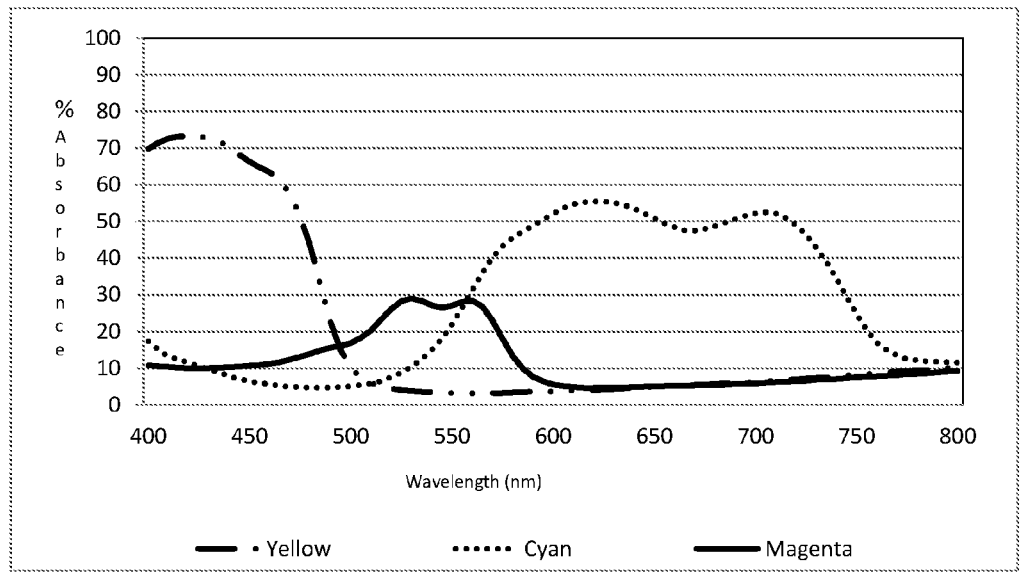
FIG. 4 is a graph depicting electromagnetic absorption data generated from analysis of the electromagnetic energy-absorbing optical products produced in Example 4.

To form electromagnetic energy-absorbing optical products of the present invention, three sheets of polyethylene terephthalate (PET) film (as substrate) with a thickness of 75 microns were pretreated as known in the art by passing them through a conventional corona treatment. A first layer was then formed on each PET sheet by spray coating a 20 mM solution, based on the molecular weight of the charged repeat unit, of polyallylamine hydrochloride with an adjusted solution pH of 10. Excess first layer material was rinsed away with a deionized water spray. The coating compositions prepared in Example 3 above were then each sprayed onto the surface of a separate coated sheet with excess material again rinsed away in a similar fashion. The first layer and the second layer together constitute the composite coating of the present invention. In this example, three separate electromagnetic energy-absorbing optical product samples, each using one of the coating compositions created in Example 3, were created by repeating the above deposition process for each substrate 5 times, thereby depositing 5 composite coatings on each substrate. The electromagnetic absorbance for each of the three pure color samples at various wavelengths was then measured using a UV-vis spectrometer and is plotted against those wavelengths graphically in FIG. 4.

EXAMPLE 5

Figure 5:
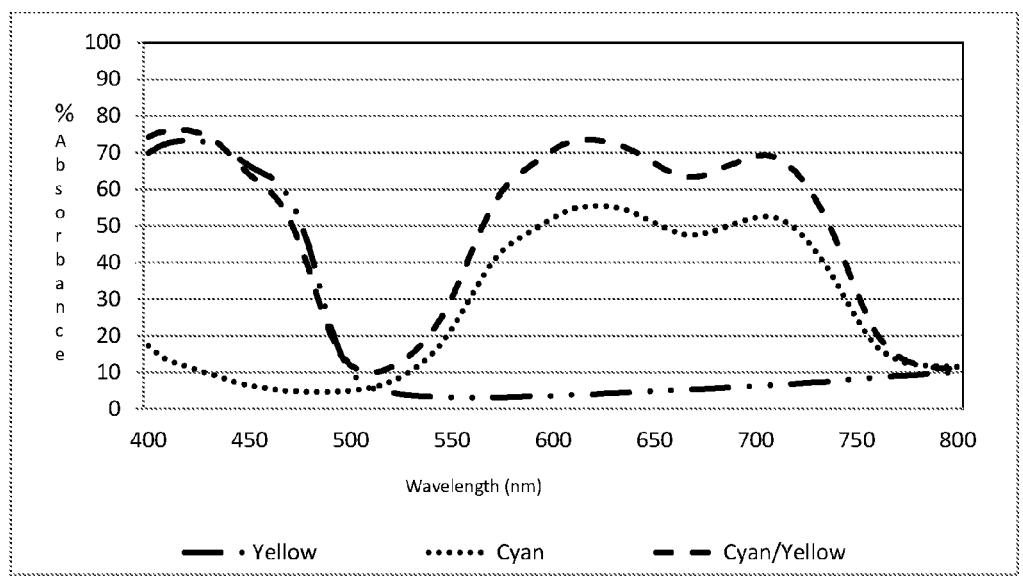
FIG. 5 is a graph depicting electromagnetic absorption data generated from analysis of the electromagnetic energy-absorbing optical products produced in Examples 4 and 5.

To demonstrate the use of multiple electromagnetic energy-absorbing insoluble particles in a single second coating composition and accordingly a second layer, a green second coating composition was produced by forming a pigment blend using a 50/50 mixture of the cyan- and yellow-pigment compositions prepared in Example 3. The procedure of Example 2 was then utilized to form an electromagnetic energy-absorbing optical product with the first layer of Example 2 and a second layer formed from the green composition described above. The deposition process was repeated for the substrate 5 times, thereby depositing 5 composite coatings on the substrate. The electromagnetic absorbance at various wavelengths for the sample was then measured using a UV-vis spectrometer and is plotted graphically against those wavelengths along with the plots for the Example 4 samples with cyan and yellow pigment in FIG. 5.

EXAMPLE 6

Figure 6:
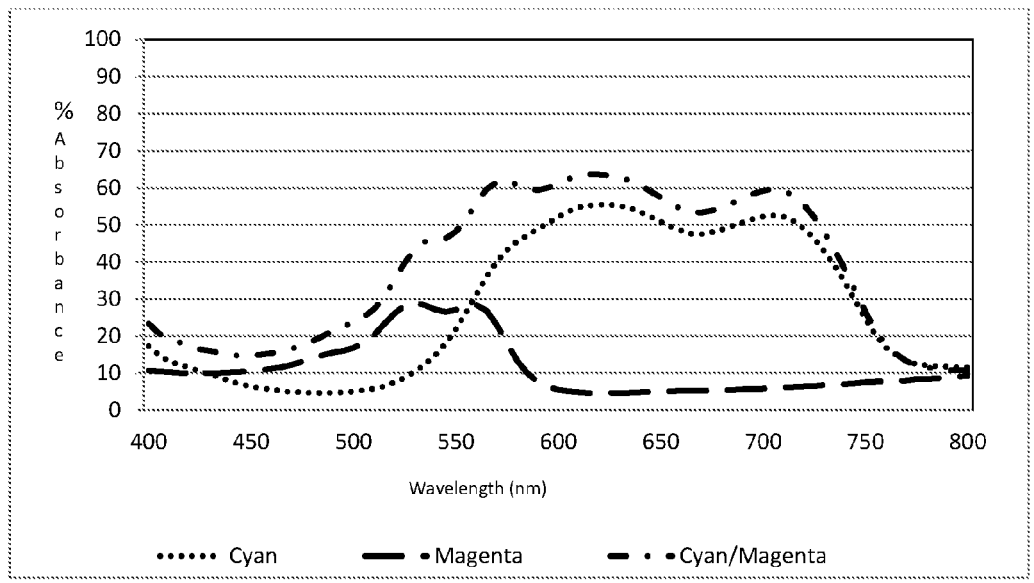
FIG. 6 is a graph depicting electromagnetic absorption data generated from analysis of the electromagnetic energy-absorbing optical products produced in Examples 4 and 6.

To demonstrate the use of multiple electromagnetic energy-absorbing insoluble particles in a single second coating composition and accordingly a second layer, a blue composition was produced by forming a pigment blend using a 50/50 mixture of the cyan- and magenta-pigment compositions prepared in Example 3. The procedure of Example 2 was then utilized to form an electromagnetic energy-absorbing optical product with the first layer of Example 2 and a second layer formed from the blue second coating composition described above. The deposition process was repeated for the substrate 5 times, thereby depositing 5 composite coatings on the substrate. The electromagnetic absorbance at various wavelengths for the sample was then measured using a UV-vis spectrometer and is plotted graphically along with the plots for the Example 4 samples with cyan and magenta pigments in FIG. 6.

EXAMPLE 7

Figure 7:
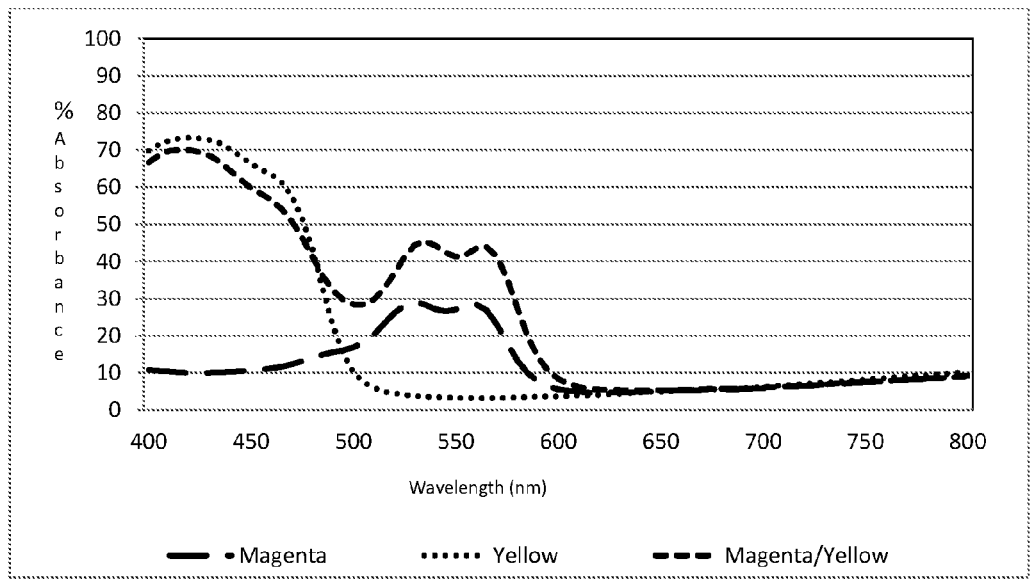
FIG. 7 is a graph depicting electromagnetic absorption data generated from analysis of the electromagnetic energy-absorbing optical products produced in Examples 4 and 7.

To further demonstrate the use of multiple electromagnetic energy-absorbing insoluble particles in a single second coating composition and accordingly a second layer, a red composition was produced by forming a pigment blend using a 50/50 mixture of the yellow- and magenta-pigment compositions prepared in Example 3. The procedure of Example 2 was then utilized to form a colored optical product with the first layer of Example 2 and a second layer formed from the red composition described above. The deposition process was repeated for the substrate 5 times, thereby depositing 5 composite colorant coatings on the substrate. The electromagnetic absorbance for the sample at various wavelengths was then measured using UV-vis spectrometer and is plotted against those wavelengths along with the plots for the Example 4 samples with magenta and yellow pigments in FIG. 7.

EXAMPLE 8

Figure 8:
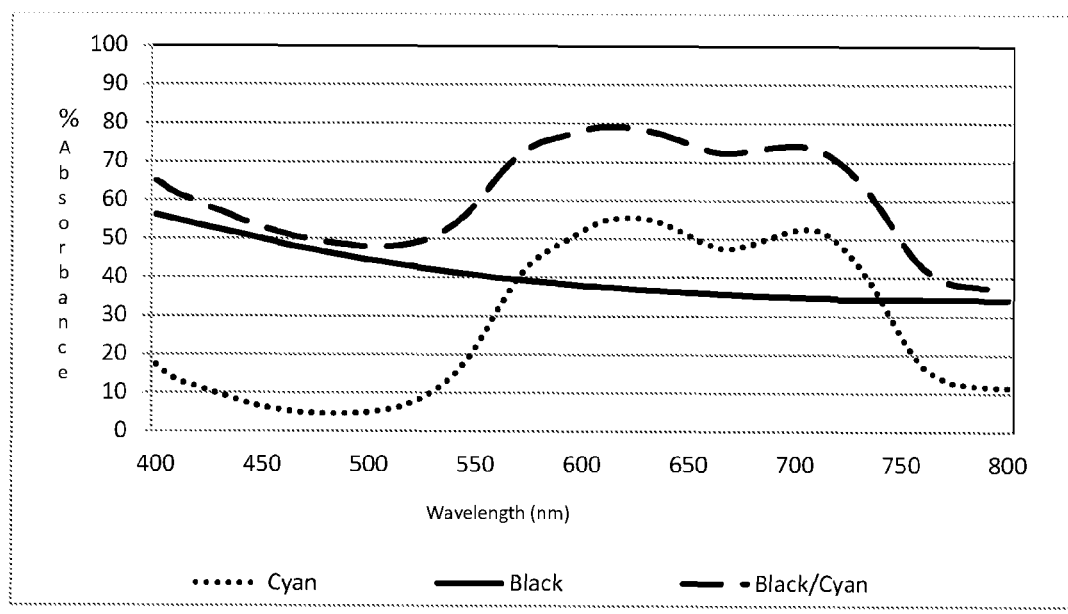
FIG. 8 is a graph depicting electromagnetic absorption data generated from analysis of electromagnetic energy-absorbing optical products produced in Examples 2, 4 and 8.

A film of reduced visible transmission and tunable color can be created by depositing the desired number of composite coatings with carbon black as the electromagnetic energy-absorbing insoluble particle (Example 2) followed by the desired number of composite coatings with cyan, magenta and yellow pigments or a combination thereof (Examples 4-7). Here the deposition process was repeated for the substrate 5 times where the second layer contains carbon black followed by 5 times where the second layer contains cyan pigment, thereby depositing a total of 10 composite coatings on the substrate. The electromagnetic absorbance for the sample at various wavelengths was then measured using UV-vis spectrometer and is plotted against those wavelengths along with the plots for a black pigment-containing sample with five composite coatings generated in the manner of Example 2 and a cyan pigment-containing sample with five composite coatings generated in the manner of Example 4 in FIG. 8.

EXAMPLE 9

To further demonstrate the use of pigment blends in a single second coating composition and accordingly a second layer, coating compositions with a blend of three or more pigments listed in the Table below.

| Product # | Color | Primary Particle Size |
|---|---|---|
| Cab-o-Jet 250C | cyan | 118 nm |
| Cab-o-Jet 265M | magenta | 102 nm |
| Cab-o-Jet 270Y | yellow | 174 nm |
| Cab-o-Jet 554B | violet | 130 nm |
| Cab-o-Jet 1027R | red | 125 nm |
| Cab-o-Jet 200 | black | 141 nm | each with ionizable sulfonate functionality at its surface, can be mixed into a single coating composition as described in Example 3. The procedure of Example 2 may then be utilized to form a colored optical product with the first layer of Example 2 and a second layer formed from the pigment blend-containing composition described above. The deposition process may be repeated for the substrate multiple times to deposit multiple composite coatings on the substrate and achieve increasing coloration with each repetition. The electromagnetic absorbance for the sample at various wavelengths may be then be measured using UV/vis spectrometer and plotted against those wavelengths, with individual specific blends achieving corresponding electromagnetic absorbance (manifested by color) within a given color space defined by the individual pigment colors. Employing three or more pigments in the pigment blend in varying amounts allows for a correspondingly tunable variety of color effects.

EXAMPLE 10

This example illustrates use of a pigment blend in a single second coating composition and accordingly a second layer wherein the pigment blend includes at least one first pigment with a first ionizable functionality its surface and at least one second pigment with a second ionizable functionality at its surface that is different from the first ionizable functionality. Specifically, a first coating composition for the first layer of the optical product is formed by dissolving 1.87 g of poly(allylamine hydrochloride) per liter of deionized water, and titrating the pH of the resulting solution to 9.5 using sodium hydroxide. A second coating composition for forming the second layer, a 0.5 wt % solids pigment blend dispersion of Cab-o-Jet 352K black, Cab-o-Jet 250C cyan, and Cab-o-Jet 265M magenta pigments in distilled water is also formed, with 2.92 g of sodium chloride added as screening agent to ionically screen the colloidal particles and prepare them for deposition. As noted from previous examples, the 352K black pigment has ionizable carboxylate functionality at its surface (see Example 1) while the 250C cyan and 265M magenta pigments have ionizable sulfonate functionality at their respective surfaces (see Example 3). Titrating the second coating composition to pH 7.5 produces a scenario where approximately 75% of the Cab-o-Jet 352K black pigment ionizable carboxylate functionalities are ionized to form negative carboxylate groups, while 25% are not ionized and are present as carboxylic acids. This was found empirically to reduce the charge density on the black pigment to more closely match the sulfonate charge density on the cyan and magenta pigments. The procedure of Example 2 may then be utilized to form an optical product with the first layer from the first composition above and a second layer, including a pigment blend, formed from the pigment blend-containing second coating composition described above. As with previous examples, the deposition process may be repeated for the substrate multiple times to deposit multiple composite coatings on the substrate and achieve increasing coloration with each repetition.

A person skilled in the art will recognize that the measurements described herein are measurements based on publicly available standards and guidelines that can be obtained by a variety of different specific test methods. The test methods described represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in electromagnetic energy of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. An electromagnetic energy-absorbing optical product comprising:
   a) a polymeric substrate; and
   b) a composite coating, said composite coating comprising a first layer comprising a polyionic binder and a second layer comprising a pigment blend, wherein each of said first layer and said second layer includes a binding group component which together form a complimentary binding group pair.

2. The optical product of claim 1 wherein said pigment has an average particle diameter of between 5 and 300 nanometers.

3. The optical product of claim 1 wherein said first layer is immediately adjacent to said polymeric substrate at its first face and said second layer is immediately adjacent to said first layer at its opposite face.

4. The optical product of claim 1 wherein said binding group component of said second layer is an ionizable functionality at the surface of each pigment in said pigment blend.

5. The optical product of claim 4 wherein said ionizable functionality is the same ionizable functionality for each pigment in said pigment blend.

6. The optical product of claim 5 wherein said same ionizable functionality is an ionizable sulfonate functionality.

7. The optical product of claim 5 wherein said same ionizable functionality is an ionizable carboxylate functionality.

8. The optical product of claim 4 wherein said pigment blend comprises at least one first pigment with a first ionizable functionality its surface and at least one second pigment with a second ionizable functionality at its surface that is different from said first ionizable functionality.

9. The optical product of claim 8 wherein said first ionizable functionality is an ionizable sulfonate functionality and said second ionizable functionality is an ionizable carboxylate functionality.

10. The optical product of claim 8 wherein said pigment blend comprises at least one additional pigment with ionizable functionality at its surface that is the same as or different from either said first or said second ionizable functionality.

11. The optical product of claim 1 wherein the polymeric substrate is a polyethylene terephthalate film and further comprises an ultraviolet absorbing material.

12. The optical product of claim 1 wherein said polymeric substrate is an undyed transparent polyethylene terephthalate film.

13. The optical product of claim 1 wherein said polymeric substrate comprises a coating layer selected from the group consisting of a metallic layer, a dielectric layer, a ceramic layer and combinations thereof, as a component.

14. The optical product of claim 1 wherein at least one of said first layer and said second layer of said composite coating is formed from an aqueous dispersion.

15. The optical product of claim 1 wherein said optical product is a composite interlayer for laminated glass and further includes at least one safety film or interlayer.

16. The optical product of claim 5 wherein said optical product has a $T_{vis}$ of no more than 50%.

17. The optical product of claim 4 wherein said optical product has a $T_{vis}$ of no less than 80%.

18. The optical product of claim 8 wherein said optical product has a $T_{vis}$ of no more than 50%.

19. The optical product of claim 17 wherein said optical product has a $T_{vis}$ of no more than 25%.

20. The optical product of claim 18 wherein said optical product has a $T_{vis}$ of no more than 10%.

\* \* \* \* \*